Aug. 11, 1970     D. C. VENCILL     3,523,371
TUBING MEASURING AND MARKING DEVICE FOR MARKING
PIPE BENDER FEEDSTOCK

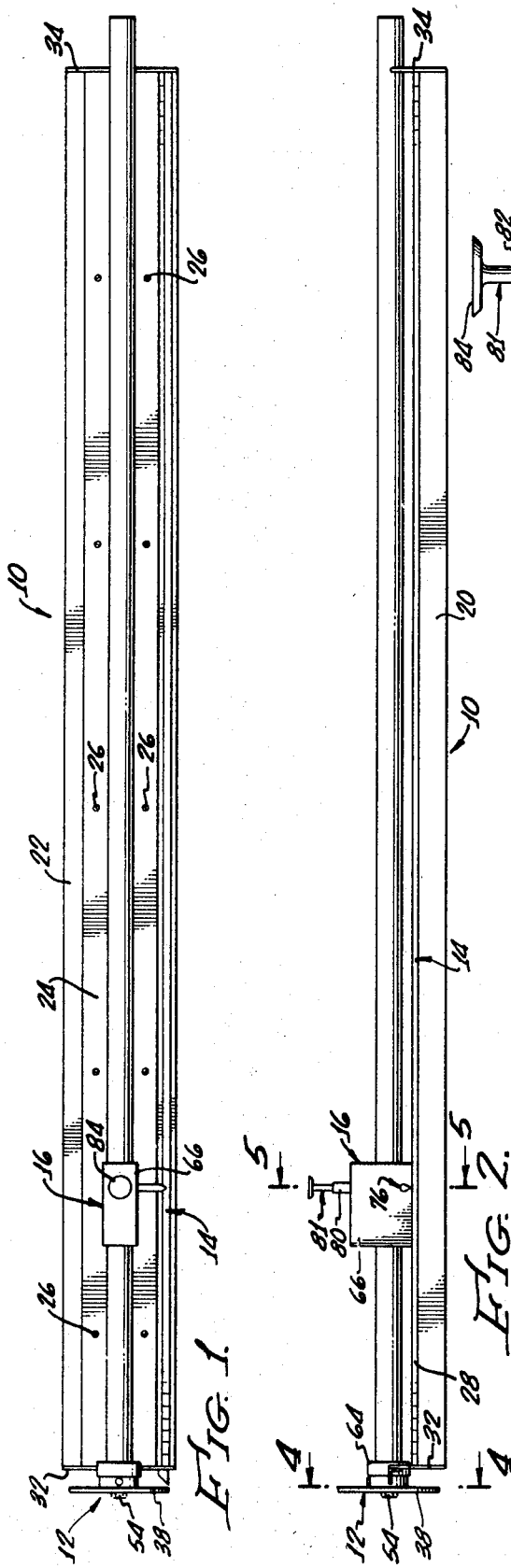
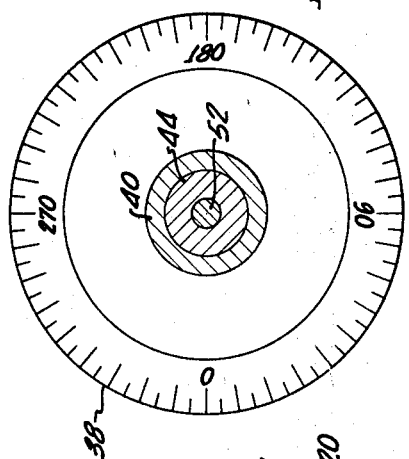
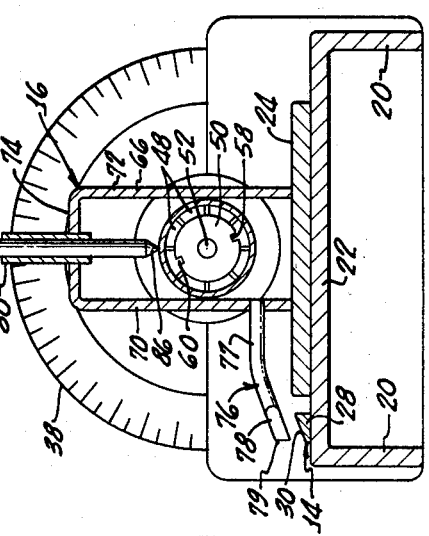
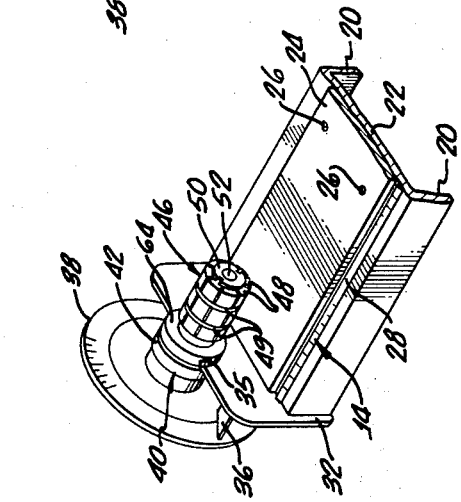
INVENTOR.
DONALD C. VENCILL
BY
FOWLER, KNOBBE
& MARTENS
ATTORNEYS.

Filed Feb. 20, 1968     2 Sheets-Sheet 2

INVENTOR.
DONALD C. VENCILL

BY
FOWLER, KNOBBE
& MARTENS
ATTORNEYS.

United States Patent Office 3,523,371
Patented Aug. 11, 1970

3,523,371
TUBING MEASURING AND MARKING DEVICE FOR MARKING PIPE BENDER FEEDSTOCK
Donald C. Vencill, 2365 Transit,
Anaheim, Calif. 92804
Filed Feb. 20, 1968, Ser. No. 706,910
Int. Cl. B23b 49/02
U.S. Cl. 33—189                                    10 Claims

ABSTRACT OF THE DISCLOSURE

A device for premarking tubings so that they can be bent in a simple, relatively inexpensive bending machine. The device comprises a support base having a longitudinally extending slide track thereon and two tubing support members at the opposite ends thereof. A rotation wheel is mounted on one of the support members so that it will be connected to a tubing mounted on the supports for indicating the degree of rotation of the tubing. An axial distance measuring and marking assembly is adapted to fit over the tubing for locating the axial parameters of each bend position. This assembly contacts the sides of the tubing and follows the tubing configuration so that bowed or slightly bent tubings can be marked accurately at the rotational parameter of each bending point which is automatically related back to the rotational parameters of other bending points.

BACKGROUND OF THE INVENTION

Tail pipe replacement tubing is received in a standard diameter 10 foot section which is then bent into appropriate configurations so that it will fit on various makes and models of automobiles. So the pipe will conform to the contour of the automobile, often as many as eight or nine bends must be made in the tubing. These bends are axially spaced along the tubing and may be at any angle of rotation of the tubing. Similar bends must be made in the rigid metal tubing or pipe used as electric conduit for use in large buildings and industrial plants.

At the present time when a tail pipe is to be replaced, the straight pipe must be bent into the sinuous configuration which conforms to the type of automobile for which the pipe is going to be used. This requires that the individual muffler services and service stations stock the bent pipe or, as is usually the case, send out to a parts house or warehouse which has such a stockpile of bent pipes. Even though considerable space is required for stocking the bent tail pipes, most parts houses prefer to maintain an inventory of them in this manner since the cost of the bending machines which are presently available is too high and the bending machines do not produce accurate bends on tubing which is not perfectly straight.

One reason that the cost of the presently existing bending machines is so high is that each machine must include some means for orienting the pipe within the machine in an appropriate manner to make the bend. This usually entails the use of a rotation wheel, a means for holding the pipe, some means for axially locating various distances of bends on the pipe, the bending plunger itself and back shoes which determine the severity of the bend at each location. Additionally these bending machines, due to their complexity, require a relatively skilled person to make the bends in a reasonably accurate manner.

Heretofore there has been no manner for accurately premarking tail pipe tubing so that it can be bent in a relatively simple, inexpensive bending machine by unskilled employees. With such a device, parts houses and other small facilities could stock the straight tubing as it's premarked and simply bend the tubing as required. This would enable their inventory to be increased with the same storage space since it is much less space consuming to store straight tubing than to store the bent tail pipes.

Each bending point for a tail pipe can be identified by a rotational and axial parameter. These parameters are indexed for the various automobiles. For example, the first bend point may be identified as 0°, 7"; the second as 200°, 15" etc., until all of the bends are located.

A problem which has hindered the development of a satisfactory premarking device for tail pipe tubing is that the tubing usually becomes bowed or otherwise bent slightly during handling so that the axis of the tubing does not form a straight line. This causes difficulty in orienting the tubing for accurately locating rotational parameters for marking. The rotational orientation of the tubing is most important in locating the bend point because, due to the small diameter of automobile tail pipes, a very small deviation from the correct circumferential location of the point for the bend causes a relatively large angular inaccuracy which may make the pipe unusable.

It has been found to be imposible to produce an accurate, reliable premarking device with a slideable marking member mounted to move along a straight guide track commencing at one end of the tubing because most of the tubings are not perfectly straight. To compensate for the deviation from straight tubings, there must be some manner of referencing a point on the tubing circumference to all other points used to identify the rotational orientation of the tubing. This can be accomplished by passing a line through the zero degree rotational parameter, extending the line parallel to the axis of the tubing along its circumference and measuring the rotational parameters of all points with respect to the zero degree line. For example, once the first point has been marked, the indexed axial distance is measured along a line on the tubing circumference which is maintained substantially parallel to the axis of the tubing and the indexed rotational position is then located by rotating the tubing the required number of degrees from the line. This accurately relates the axial and rotational parameters of the previous reference point to the next successive reference point even though the tubing may not be perfectly straight. This indexed point is then identified by marking the circumference of the tubing. In this manner, each indexed bending point is located with respect to the previous indexed bending point since the degree of rotation of the tube is measured accurately from a point on a line parallel to the axis of the tubing. The tubings so marked always have each rotational point referenced back to the previous point and thus the rotational angle of each bend is accurately indicated.

Clearly there is a need for a device that will incorporate this procedure simply and effectively into its operation so that it can be easily operated by unskilled employees in a parts house, warehouse, muffler service facility, service station, etc. so that the tail pipe tubings can be accurately marked for bending in a simple bending machine.

SUMMARY OF THE INVENTION

This invention relates to a device for premarking tubings and is especially adaptable for use in premarking tail pipe tubing feedstock. The device includes a rotational degree graduated means adapted to be connected to a tubing for rotation therewith and a means on the device for indicating the rotational orientation of the tubing. An axially and transversely movable member is mounted on the device and is adapted to move substantially parallel to the axis of the tubing for locating the axial parameters of bending points on the tubing and to remain a fixed distance from the axis of said tubing while said tubing is rotated to locate the rotational parameters of the bending points. A marking instrument is connected to the movable member for marking the bending points once the axial and rotational parameters thereof have been located. The marking instrument is maintained in fixed relation to the movable member and is connected thereto for movement therewith.

The rotational position of the tubing is located by means of a 360° rotational wheel which is connected to the tubing for rotation therewith. The wheel cooperates with a pointer which is fixed to the device for indicating the rotational position of the tubing. In this manner the relative rotational position of the tubing with respect to the pointer can be read directly from the rotational wheel at the location of the fixed pointer.

The axial positions of the bending points along the tubing are located by means of an assembly which comprises a slide member having at least one portion of which is always in contact with the periphery of the tubing. In this manner, as the slide member moves axially along the tubing with the circumference of the tubing as a guide, it moves along a line which is parallel to the axis of the tubing. The slide member includes a marking instrument mounted thereon in a fixed position with respect to the point of contact between the tubing and the slide member so that the marking instrument also moves parallel to the axis of the tubing. In a preferred embodiment of the device of this invention the slide member is a three sided metallic slide which has an inverted U-shaped transverse cross-sectional configuration with the sides being spaced apart by a distance which is substantially equal to the diameter of the tubing so that each of the sides is in contact with the tubing as the slide member moves. In this embodiment, the marking instrument consists of a vertically mounted punch which closely fits in a vertical sleeve extending through the top side of the slide for reciprocal movement into marking contact with the tubing. The axial position of the slide member, in this embodiment, is measured by means of an indicating pointer which extends laterally from one of the sides of the slide and cooperates with a graduated surface on the base of the device. The support base for the device of this invention includes a smooth axially extending, planar track surface which supports the slide member for axial and transverse movement.

A feature of the tail pipe tubing premarking device of this invention is that the rotational and axial parameters of each bending point are automatically located with respect to a line parallel to the axis of the tubing so that the degree of rotation of the tubing is accurately located even if the tubing is bowed or slightly bent out of straight configuration.

Another feature of the device of this invention is that the device can be operated by an unskilled technician with relatively little difficulty and the premarked tubings may similarly be bent into the proper sinuous configuration by persons having little experience with relatively simple bending machines.

Another feature of the device of this invention is that it is portable and occupies a relatively small amount of space so that it can be used by small businesses having storage space limitations.

Still another feature of this invention is that several tubings can be premarked with true duplication of results so that after bending the bent tubings from the same set of indexed parameters are interchangeable.

These and other features of the device of this invention will become more readily apparent from the following discussion when taken in conjunction with the appended claims and the attached drawings,

BRIEF DESCRIPTION OF DRAWINGS

FIG. 1 is a plan view of the tubing marking device of this invention;

FIG. 2 is a side elevation of the tubing marking device of this invention;

FIG. 3 is an oblique view of the left end of the device of FIG. 2 showing the mounting sleeve and rotation wheel;

FIG. 4 is a transverse sectional view taken substantially along line 4—4 of FIG. 2 showing the rotation wheel and mounting sleeve;

FIG. 5 is a transverse sectional view taken substantially along line 5—5 of FIG. 2;

DESCRIPTION OF PREFERRED EMBODIMENTS

Figure 6:
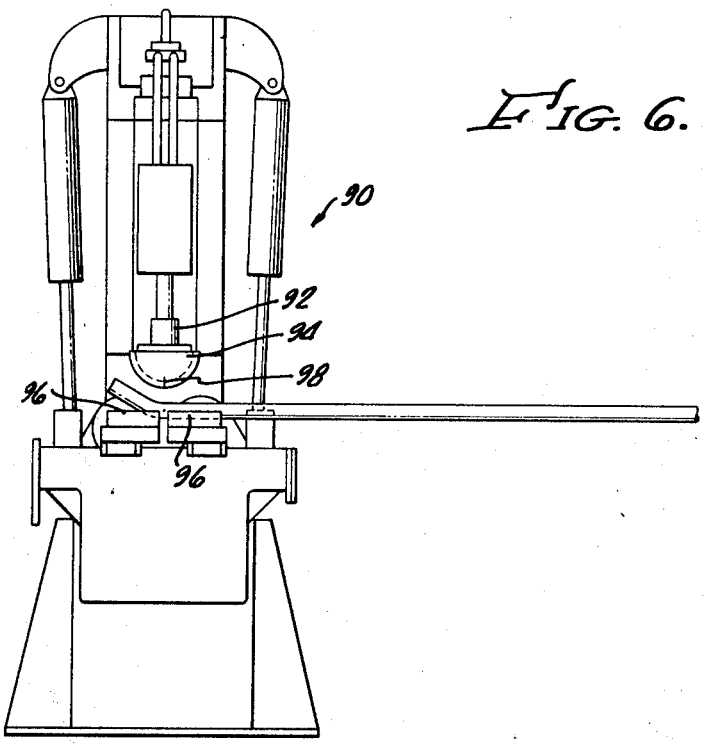
FIG. 6 is a diagrammatic view of a tubing bending machine showing a tubing being bent.

Basically the device of this invention, as shown in FIG. 1, comprises a tubing support base 10 including a rotational degree measuring assembly 12, a graduated axial position measuring member 14, and a marking and axial position locating assembly 16.

The support base 10 as best shown in FIG. 3, is provided with a pair of depending support legs 20 and a horizontally extending upper surface portion 22. A planar, hard, smooth track surface 24 such as a bar of high carbon steel or stainless steel is affixed to the upper surface of the support base by suitable fastening means, such as countersunk screws 26, to provide a hard flat surface for sliding movement of the marking and axial position locating assembly 16. The track surface 24 is not as wide as the support base so that the upper surface of the device has a forward and rear step. The forward step, or the upper surface 22 in front of the track 24, is fixedly connected to the axial position measuring member 14 which comprises an axially extending rule 28 having a graduated, inclined surface 30 (see FIG. 5) which extends for the length of the support base. This surface is graduated to measure distances from the left end of the device. The rule may be threadedly, adhesively or otherwise appropriately fastened to the base and may be constructed from plastic or metal.

The support base is also provided with a pair of upstanding tubing end support members 32 and 34 at its left and right ends respectively as shown in FIG. 2. The support 34 is provided with a centrally located tube holding notch (not shown) for example a V-notch. The tubing support member 32, at the left end of the support base, is provided with a centrally located semi-circular cut away portion 35.

A pointer 36 extends axially from support member 32 and forms a part of the rotational degree measuring assembly 12. The assembly further comprises a manually rotatable 360° graduated wheel 38 which is fixedly connected to a sleeve 40 which has a circumferential groove 42. The circumferential groove 42 of the sleeve 40 is rotatably fitted in the cut away portion 35 of the left end support member 32. The sleeve 40 fits over a bushing 44 (see FIG. 4) which axially extends toward a radially expandable sleeve 46 which is radially divided into axially extending radially tapered segments 48 which are held together by a pair of O-rings 49 and maintained in position by a pair of frusto-conical nuts 50 (one shown) disposed in the opposite ends of the sleeve 46.

The manually rotatable 360° wheel 38 is centrally apertured for passing a bolt 52, the head 54 of which is shown at the left of FIGS. 1 and 2. The bolt threadedly engages one of the frusto-conical nuts 50 which has axially extending keyways 58 for receiving axially extending, radial keys 60 from certain of the segments of the segmented sleeve (see FIG. 5). As the bolt 52 is drawn tight, the nut 50 is threadedly advanced to the left of FIGS. 1 and 2 expanding the expandable sleeve segments 48. The bolt passes through the other frusto-conical nut but does not threadedly engage it so that when the bolt is drawn tight the radial segments are expanded outwardly. If a tubing is mounted over the expandable sleeve 46 as shown in FIGS. 1 and 2, the sleeve frictionally engages the inner wall of the tubing connecting it to the manually rotatable 360° rotation wheel for rotation therewith. Any of various expandable sleeves such as 46 which are commercially available may be used for connecting the tubing to the rotation wheel or it may be connected for rotation therewith by other type conventional fittings.

The sleeve 40 is of larger diameter than expandable sleeve 46 so that if a tubing is mounted over the expandable sleeve 46, the end of the tubing firmly abuts the right end surface 64 of the sleeve 40. When a tubing is mounted in this position, its left end (as viewed in FIG. 2) is aligned with the zero graduation of rule 28. This alignment of the tubing with the axial measuring surface is automatically accomplished due to the alignment of groove 42 in the sleeve 40 and the tubing support 32.

The tubing marking and axial distance measuring assembly 16 can freely move axially and transversely on the hard, upper surface of the track 24 on the support base 10. This measuring and marking assembly comprises an axially extending slide member 66 which has an inverted U configuration in transverse section. As shown in FIG. 5, the inverted U-shaped slide member is supported on the track 24 by a front side 70 and a back side 72. These sides are separated by a distance substantially equal to the diameter of conventional automobile tail pipe tubings and are maintained at this spaced relation by an upper end wall 74.

The front side 70 of the slide member carries an axial position indicating follower or pointer 76 which extends forwardly therefrom and is divided into a horizontally extending portion 77 and an indicating portion 78 which extends downwardly at an obtuse angle from the portion 77 and terminates in a V-shaped, sharp end surface 79 as shown in FIG. 1. The indicating portion 78 is adapted to follow the graduated, inclined surface 30 and rides above this graduated surface while the slide member 66 is moved on the track 24. The slide member 66 is movable both axially and transversely along the track 24 so that some clearance is provided between the follower 76 and the axial distance measuring surface 30 by making the horizontal portion 77 of the follower 76 long enough to permit transverse movement of the slide while the pointed indicating edge 79 is maintained over surface 30.

As shown in FIG. 5, the upper end wall 74 of the marking and longitudinal measuring assembly 16 is apertured midway between the sides 70 and 72 and transversely aligned with the pointer 76 to pass a vertically extending sleeve 80 which is fixedly mounted thereto as by welding. A cylindrical punch 81 is closely fitted to move vertically within the sleeve as best shown in FIG. 5. The punch comprises a shaft portion 82, a flat head portion 84, and a pointed marking end 86 which produces a small indentation on the tubing when a downwardly directed force is applied to the head 84. The vertically extending sleeve 80 maintains the punch 81 in vertical position at all times so that the marking end 86 is transversely aligned with the sharp edge 79. Since the sides 70 and 72 of the slide are spaced apart by a distance equal to substantially the external diameter of the tubing, the punch 81 always is aligned perpendicular to the axis of the tubing. While it is preferred to locate the sleeve 80 midway between legs 70 and 72 this is not necessary as long as the relative position of the sleeve remains constant.

Figure 8:
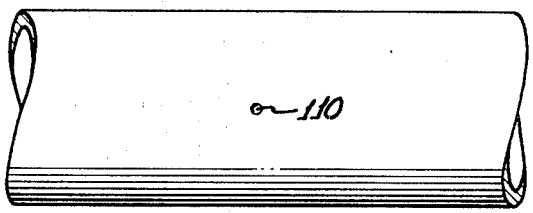
FIG. 8 is a plan view of a section of marked tubing.

To mark a tubing with the device of this invention, one end of the tubing is first mounted over the expandable sleeve 46 so that it abuts tightly against the grooved sleeve end surface 64. The bolt 54 is then rotated to tighten the keywayed nuts 50 and expand the sleeve 46 thereby fixing the tubing for rotation with the rotation wheel. The tubing is now ready to be marked. The first indexed bending point is located by sliding the marking assembly 16 axially by the indexed number of inches along the slide track as indicated by follower 76 on surface 30. The rotational degree indicator 36 is set at zero degrees on the rotation wheel 38 initially and the indexed degree of rotation is then obtained by rotating the tubing in the appropriate direction to the indexed number of degrees. The longitudinal parameter and the rotational parameter of the first bending point have thus been located. The tubing is marked by tapping the head of the punch 81 with an instrument such as a hammer which applies a small indentation in the tubing as shown in FIG. 8.

The next indexed bending point is ready to be located. The marking assembly is slid axially along the track by the next indexed distance with the tubing as its guide. Since the sides of the inverted U-shaped slide are separated by a distance substantially equal to the diameter of the tubing, the punch is always aligned directly over the axis of the tubing even though the tubing is bowed or otherwise bent by a small amount out of straight line configuration. When the axial parameter of the second indexed bending point has been located, the tubing is rotated by the required number of degrees to locate the rotational parameter of the second bending point. Since the punch is maintained in a fixed relationship to the axis of the tubing at all times by the alignment of the slide with the slide track, the degree of rotation is measured with respect to a line from the first point which is parallel to the tubing axis so that the rotational parameter of the second bending point is related back to the rotational parameter at the first bending point. The tubing is then marked at this second indexed bending point. Each successive bending point is then located in a similar manner until all of the bending points have been indicated on the tubing. The tubing is now ready for bending. Due to the configuration of the slide 66 the tubing can move vertically within the slide and the punch is still maintained in a fixed rotational relationship with the tubing axis.

As shown in FIG. 6, the marked tubing may be accurately bent by hydraulically actuated bending machine 90 which includes a vertically reciprocating bending plunger 92 with a rimmed lower surface 94 which reciprocally moves toward a pair of horizontally aligned bending shoes or dies 96. The severity of the bend is determined by the angle of the bending shoes 96 and is also indexed for each bending point. The location of the bend is determined by aligning a mark such as a notch 98 on the plunger end surface with the point which was premarked by the device of this invention. For the illustrated machine the point may be aligned on the side of the tubing with the notch 98 as long as each premarked point is so aligned. The plunger of the bending machine may be ink marked or notched so that its lowermost point can be aligned with a marked point on the tubing. In this manner an unskilled laborer can simply lineup the plunger with the previously marked points on the tubing and perform a plurality of bends in a tubing in a relatively simple fashion.

While the device of this invention has been shown using a punch for marking the bending points, it is clear that these points can be ink marked or marked in any other manner which produces a visible mark after the bending points have been accurately located by the device of this invention.

It also should be clear that although the slideable marking assembly has been shown to have side supports of equal length it is clear that these legs could be of variable length so long as the marking instrument is moved along a line parallel to the axis of the tubing and each rotational and axial parameter thereafter is measured with respect to that line.

Figure 7:
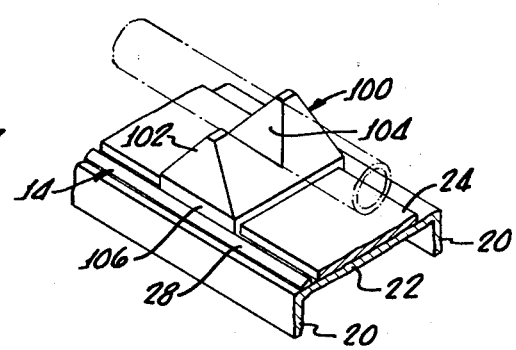
FIG. 7 is an oblique view of an auxiliary mounting member showing a tubing mounting in place on the assembly.

The device, as illustrated in FIGS. 1 and 2, is arranged for marking standard ten foot tubing sections for conventional automobile tail pipes. FIG. 7 illustrates an auxiliary slideable tubing support member 100 which may be used when shorter lengths of tubing are to be marked. It is conceivable that shorter sections of tubing or pipe may have to be marked for bending in a similar manner and with the auxiliary slideable support 100 of FIG. 7 this is possible. The support comprises an upwardly extending wedge-shaped body portion 102 having a centrally located V-notch 104 for receiving a tubing as shown by the phantom lines of FIG. 7. A pair of follower legs 106 depend from the sides of the body portion for riding along the sides of the track of the support base and for maintaining the end of the tubing centrally aligned on the device. In this manner the device can be adapted to premark any length of tubing.

As shown in FIG. 8, the punch of this invention leaves such a small indentation 110 on the tubing surface that there is no appreciable harm to the tubing from being marked with a punch. If the surface characteristics of the tubing for any application are critical, however, it is possible, as aforementioned, to use an ink marking device or some other marking device which does not disfigure the tubing per se but leaves a visible mark.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device for locating and premarking bending points on a tubing comprising:
   a base;
   means for rotatably supporting said tubing and maintaining said tubing in an axially fixed position relative to said base;
   means on said base for indicating rotational orientation of said tubing;
   a member movable axially and transversely relative to said tubing, said member being mounted on said base and being adapted to move substantially parallel to the axis of said tubing for locating the axial parameters of bending points on said tubing and to remain substantially a fixed distance from the axis of said tubing while said tubing is rotated to locate rotational parameters thereof, and
   a marking instrument connected to said movable member for movement therewith in fixed relation therewith and in marking relation with said tubing for marking said tubing at the located axial and rotational parameters of said bending points.

2. A device as defined in claim 1 wherein said movable member is adapted to contact the circumference of said tubing during axial and transverse movement of said movable member and rotation of said tubing.

3. A device for locating and premarking bending points on a tubing comprising:
   a base;
   means on said base for indicating rotational orientation of said tubing;
   an axially and transversely movable member mounted on said base and being adapted to move substantially parallel to the axis of said tubing for locating the axial parameters of bending points on said tubing and to remain substantially a fixed distance from the axis of said tubing while said tubing is rotated to locate rotational parameters thereof, said member comprising a slide having an inverted U-shaped transverse section with the sides of the U being spaced apart by a distance substantially equal to the diameter of the tubing to be marked and wherein said slide is mounted over said tubing so that its opposite sides are in contact with the periphery of said tubing so that the configuration of said tubing guides the movement of said slide, and
   a marking instrument connected to said movable member for movement therewith in fixed relation therewith and in marking relation with said tubing for marking said tubing at the located axial and rotational parameters of said bending points.

4. A device as defined in claim 3 wherein said marking instrument comprises a punch mounted for reciprocal movement vertically through the upper end wall of said slide.

5. A device as defined in claim 4 wherein said slide includes a pointer extending transversely from one side thereof in transverse alignment with said marking instrument and said base further includes an axially graduated rule which cooperates with said pointer for locating the axial position of said marking instrument.

6. A device for locating and premarking bending points on a tubing comprising:
   a base;
   an axially and transversely movable member mounted on said base and being adapted to move substantially parallel to the axis of said tubing for locating the axial parameters of bending points on said tubing and to remain substantially a fixed distance from the axis of said tubing while said tubing is rotated to locate rotational parameters thereof, said member comprising a slide having an inverted U-shaped configuration in transverse cross section, the opposing sides of said slide being spaced apart by a distance substantially equal to the diameter of said tubing and being adapted to fit over said tubing in contact therewith so that said tubing provides a guide for transverse and axial movement of said slide, said slide further having an axial distance indicating pointer extending from one side thereof and a cylindrical sleeve vertically passing through the upper end wall thereof midway between said sides and in transverse alignment with said pointer;
   an elongated support base for said tubing having an axially extending rule for cooperating with said distance indicating pointer and a slide track mounted thereon for measuring, supporting and permitting axial and transverse movement of said movable member, said support base having a pair of support members disposed at its opposite ends;
   means on said device for indicating rotational orientation of said tubing comprising a 360° rotational wheel mounted rotatably in one of said support members and adapted to be connected to a tubing and rotate therewith, said indicating means comprising a pointer fixedly mounted on said one of said support members and being disposed opposite said 360° wheel for cooperation therewith, and
   a marking instrument connected to said movable member for movement therewith in fixed relation therewith and in marking relation to said tubing for marking said tubing at the located axial and rotational parameters of said bending points, said instrument comprising a punch mounted in said sleeve for reciprocal movement into marking contact with said tubing so that said punch is maintained vertically above the axis of said tubing for all positions of said slide along said tubing.

7. A device as defined in claim 6 wherein the other of said support members is axially movable on said base.

8. A device for locating and premarking bending points on a tubing for use as an automobile tail pipe comprising:
   a support base for rotatably supporting a tubing in a substantially horizontal position and for maintaining said tubing in an axially fixed position relative to said base;
   a rotational degree graduated member adapted to be connected to said tubing for rotation therewith for indicating the degree of rotation of said tubing, and
   a marking instrument and slide assembly being adapted to move axially and transversely relative to said tubing and in contact therewith, said tubing periphery providing a guide track for movement of said marking instrument and slide so that said marking instrument moves axially along a line which is substantially parallel to the axis of said tubing and remains in fixed relation to the axis of said tubing for all rotational positions thereof.

9. A process for premarking tubing prior to bending comprising:
   locating the initial axial and rotational parameters of a first bending point;
   providing a marking instrument;
   marking the initial bending point with said marking instrument;
   moving the marking instrument axially along the tubing substantially parallel to the axis of said tubing to locate the axial parameter of the next bending point;
   rotating said tubing while allowing said marking instrument to move transversely relative to said tubing and while maintaining said marking instrument coplanar with the axis of said tubing to locate the rotational parameter of said next bending point, and
   marking said next bending point with said marking instrument.

10. A process as defined in claim 9 wherein said marking instrument is maintained in vertical alignment over the axis of said tubing throughout said process.

References Cited

UNITED STATES PATENTS

| | | |
|---|---|---|
| 2,437,807 | 3/1948 | Dowell et al. |
| 2,894,326 | 7/1959 | Marsden. |
| 3,102,413 | 9/1963 | Serdahely. |
| 3,125,904 | 3/1964 | Olivieri. |

WILLIAM D. MARTIN, JR., Primary Examiner

U.S. Cl. X.R.

33—75; 77—64